Jan. 4, 1927. Re. 16,524

H. G. FITL

AUTOMATIC DISPENSER

Original Filed Sept. 25, 1923 2 Sheets-Sheet 1

Inventor

Henry G. Fitl

By J. Kaplan

Attorney

Jan. 4, 1927. Re. 16,524

H. G. FITL

AUTOMATIC DISPENSER

Original Filed Sept. 25, 1923 2 Sheets-Sheet 2

Inventor

Henry G. Fitl

By J. Kaplan

Attorney

Reissued Jan. 4, 1927.

Re. 16,524

UNITED STATES PATENT OFFICE.

HENRY G. FITL, OF WASHINGTON, DISTRICT OF COLUMBIA, ASSIGNOR OF ONE-HALF TO HARRY LAMBROS, OF WASHINGTON, DISTRICT OF COLUMBIA.

AUTOMATIC DISPENSER.

Original No. 1,516,850, dated November 25, 1924, Serial No. 664,736, filed September 25, 1923. Application for reissue filed September 24, 1926. Serial No. 137,618.

This invention relates to improvements in dispensers and the like.

One of the principal objects of the invention is to provide a dispenser which is adapted to operate automatically in that the valve may be opened by positioning a receptacle under the mouth of the dispenser and thus engage the valve operating means to open the valve and discharge the fluid and in that upon the removal of the receptacle, the valve is automatically closed.

Another object is the provision of a simple and efficient valve actuation mechanism including a spring operated and free from any complicated system of levers or the like.

A further object is the provision of a dispenser which operates upon the placement of a receptacle upon a flat platform with a slight downward pressure applied thereon.

With the foregoing and other objects in view the invention consists in the combination of parts and in the details of construction hereinafter described, a preferred embodiment thereof being illustrated in the accompanying drawings, in which:—

Figure 1:
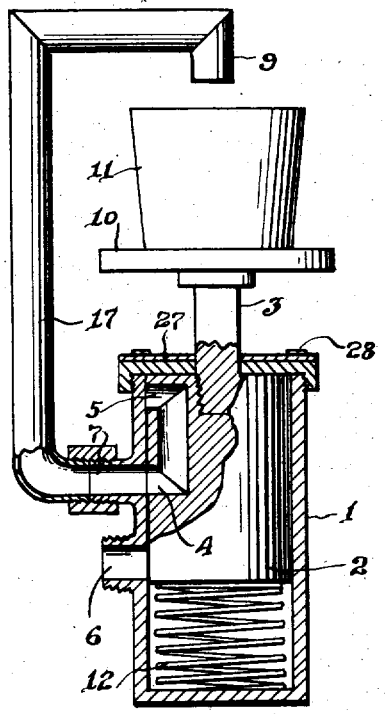
Fig. 1 is a view in vertical section through the dispenser showing the sleeve valve in closed position and the dispenser in inoperative position.

Referring more in detail to the drawings, the body 1 is made hollow to receive the cylindrical sleeve valve 2 so mounted therein as to be slidable vertically. The sleeve valve 2 is partly hollow and is provided with but two ports, 4 an inlet, and 5 an outlet, both being circular and adapted to register with those of the inlet nipple 6 and outlet nipple 7, respectively.

The valve 2 is provided with a valve stem 3 which protrudes through a suitable opening in the upper part of the body 1. Secured to and resting on this stem 3 is a substantially flat platform 10 adapted to receive any suitable receptacle 11 to be filled. In the lower portion of the hollow body 1 is arranged a compression coil spring 12 adapted to exert upward pressure on the valve 2, and normally retain the latter in closed position. A suitably curved pipe 17 is attached to the outlet nipple 7 and is provided with a discharge opening 9.

Figure 2:
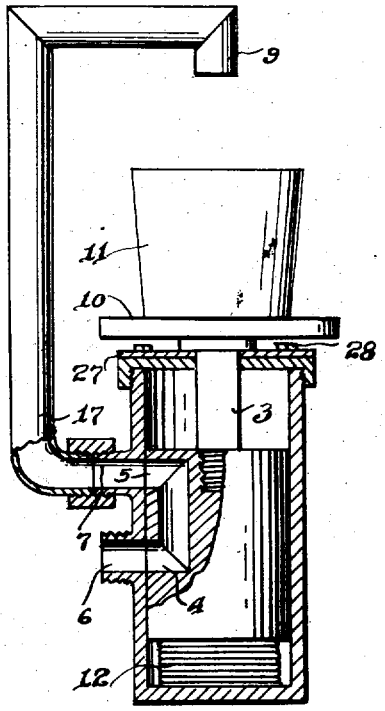
Fig. 2 is a view in vertical section through the dispenser showing the sleeve valve in open position and the dispenser in operative position.

Fig. 1 shows the spring 12 in extended position thus forcing the valve in closed position. As shown in Fig. 2, when downward pressure is applied on the platform 10 the valve 2 is forced downwardly against the action of the spring 12, and the inlet port 4 registers with that of the inlet nipple 6, while the outlet port 5 registers with that of the outlet nipple 7, thus presenting a continuous passageway for the fluid introduced through the nipple 6 to be discharged into the receptacle 11.

Upon the withdrawal of the downward pressure upon the platform 10, the compression spring forces the valve 2 upwardly and the ports 4 and 5 out of registration with those of the nipples 6 and 7, respectively, thus closing the valve and stopping the flow of the fluid as shown in Fig. 1.

Figure 3:
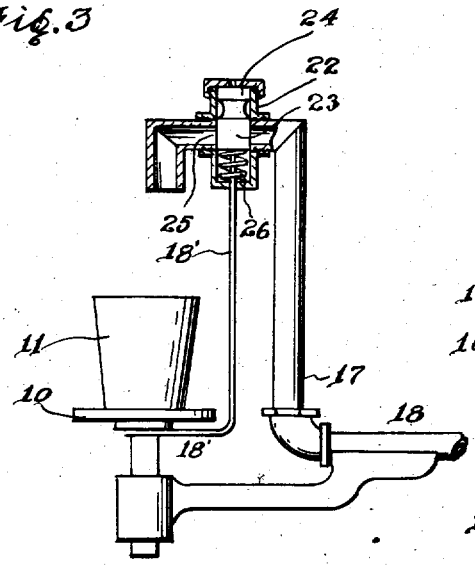
Fig. 3 is a side elevation with parts in section of a modification of the dispenser.

As shown in Fig. 3 a modified form of my invention comprises a valve casing 22 extending through the upper horizontal portion of the pipe 17, the casing having ports 25 in register with the pipe 17 and adapted to register with the recess 24 in the reciprocatory valve 23. The arm 18 is provided with an upright extension 18′ extending through the lower portion of casing 22 and connected to the valve.

When the platform 10 is pressed downwardly the downward motion is transmitted through the arm 18 and its extension 18′ to the valve 23 against the action of a compression coil spring 26 between the valve 23 and the bottom of the casing 22. This action brings the recess 24 and ports 25 into registration, opening the valve and permitting the discharge of the fluid. Upon the release of the downward pressure on the platform 10, the spring 26 automatically forces the valve upwardly into closed position.

Figure 4:
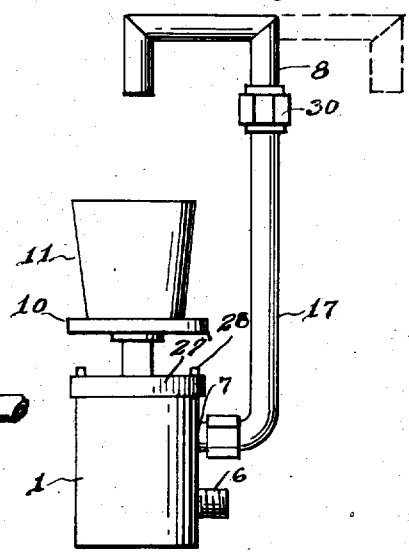
Fig. 4 is a side elevation of another modification of the dispenser showing the pipe provided with a swivel joint.

As shown in Fig. 4 the upper portion of the pipe 17 may be provided with a swivel joint at 30 in order that the discharge end of the pipe may be swung into different positions such as indicated in dotted lines for the purpose of filling larger receptacles not adaptable to be placed on the platform 10. Having so manipulated the device it is only necessary to apply pressure with the hand on the platform 10 to cause the liquid to be dispensed.

Figure 5:
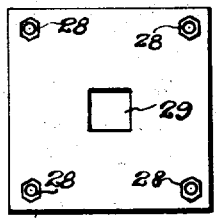
Fig. 5 is a plan view of the top plate secured to the valve body.

In all of the modifications presented the stem for supporting the platform, shown in Figs. 1, 2 and 4, is of a square cross-section so as to fit the square aperture 29 in the top plate 27 fastened on the body 1 by the screws 28, as shown in detail in Fig. 5.

Figure 6:
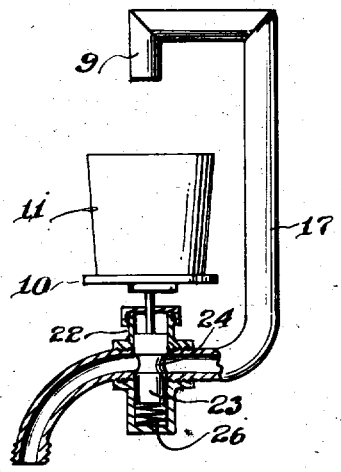
Fig. 6 is a view in vertical section through the dispensing pipe showing a valve of the type illustrated in Fig. 3 located in the lower portion of the pipe.

As shown in Fig. 6 the valve and its actuation mechanism of the type disclosed in Fig. 3 may be arranged in the lower portion of the dispensing pipe.

Having thus described my invention, I claim:—

1. A fluid dispenser comprising a body portion adapted to receive a reciprocatory valve, spring means for normally retaining said valve in upward and closed position, said valve having attached therewith and wholly supporting a receptacle platform, said valve being adapted to open upon a downward pressure on said platform and to close automatically upon the release of said pressure, the entire valve actuation mechanism operating in a vertical plane.

2. A fluid dispenser comprising a body portion adapted to receive a hollow sleeve valve, spring means for normally retaining said valve in upward and closed position, said body and valve having inlet and outlet ports, said valve having a stem carrying a receptacle platform, a pipe leading from said body outlet port to a point adjacent said platform said valve being adapted to open upon a downward pressure on said platform and to close automatically upon the release of said pressure.

3. A fluid dispenser comprising a body portion adapted to receive a hollow sleeve valve, spring means for normally retaining said valve in upward and closed position, said body and valve having inlet and outlet ports, said valve having a stem carrying a receptacle platform, a pipe leading from said body outlet port to a point adjacent said platform said valve being adapted to open upon a downward pressure on said platform and to close automatically upon the release of said pressure, said pipe being provided with a swivel joint near its upper portion.

4. A fluid dispenser comprising a body portion adapted to receive a hollow sleeve valve, spring means for normally retaining said valve in upward and closed position, said body and valve having inlet and outlet ports, said valve having a stem carrying a receptacle platform, a pipe leading from said body outlet port to a point adjacent said platform said valve being adapted to open upon a downward pressure on said platform and to close automatically upon the release of said pressure, said pipe being provided with a swivel joint near its upper portion, said valve body having a top plate with a square aperture, said valve stem being of square cross section in accordance with said aperture to prevent rotation of the valve and non-alignment of the several valve ports with those of the valve body.

In testimony whereof I affix my signature.

HENRY G. FITL.